United States Patent [19]

Akiba et al.

[11] Patent Number: 5,663,841
[45] Date of Patent: Sep. 2, 1997

[54] OPTICAL PICKUP DEVICE HAVING A MAGNETIC CIRCUIT WHOSE POLES ARE CONFIGURED ALONG A COMMON PATH WITHIN ONE POLE WITHIN A FOCUS COIL

[75] Inventors: Taichi Akiba; Osamu Ueda; Masayuki Koyama; Shigeyuki Sasanuma, all of Saitama-ken, Japan

[73] Assignee: Pioneer Electronic Corporation, Tokyo, Japan

[21] Appl. No.: 502,086

[22] Filed: Jul. 12, 1995

[30] Foreign Application Priority Data

Aug. 31, 1994 [JP] Japan .................................. 6-207231

[51] Int. Cl.⁶ .................... G02B 7/04; G11B 7/095
[52] U.S. Cl. ................ 359/814; 359/824; 369/44.16
[58] Field of Search ................ 369/44.14, 44.15, 369/44.22, 44.16; 359/813–814, 823–824

[56] References Cited

U.S. PATENT DOCUMENTS 4,842,392  6/1989  Nakamura et al. .
5,222,056  6/1993  Tanaka .

FOREIGN PATENT DOCUMENTS

4010290  10/1990  Germany .

*Primary Examiner*—W. R. Young
*Attorney, Agent, or Firm*—Sughrue, Mion, Zinn, Macpeak & Seas

[57] ABSTRACT

A holder is suspended on a carriage, and a magnetic circuit is disposed adjacent to the holder. The magnetic circuit has a first magnetic pole and a second magnetic pole. A focus coil having a magnetic flux receiving portion is provided around a vertical axis of the holder. A tacking coil having a magnetic flux receiving portion is provided around a horizontal axis of the holder. Both the magnetic flux receiving portions are disposed so as not to be overlapped with each other, and disposed in parallel with one of the surface of the first and second magnetic poles. Both of the magnetic flux receiving portions are flush with each other.

15 Claims, 9 Drawing Sheets

PRIOR ART

OPTICAL PICKUP DEVICE HAVING A MAGNETIC CIRCUIT WHOSE POLES ARE CONFIGURED ALONG A COMMON PATH WITHIN ONE POLE WITHIN A FOCUS COIL

BACKGROUND OF THE INVENTION

The present invention relates to an optical pickup for an optical disc player for reproducing information recorded on a disc, and more particularly to a system for controlling the position of an objective of the pickup.

In an optical disc player, in order to read accurately information on a disc, it is necessary to perform a focus control for correcting deflection of the distance between an objective and a tracking position of the disc due to warp and vibration of the disc and a tracking control for controlling the objective so as to follow the track. Therefore, it is necessary to provide driving devices for driving the objective in the focus direction and the tracking direction, respectively.

Figure 13:
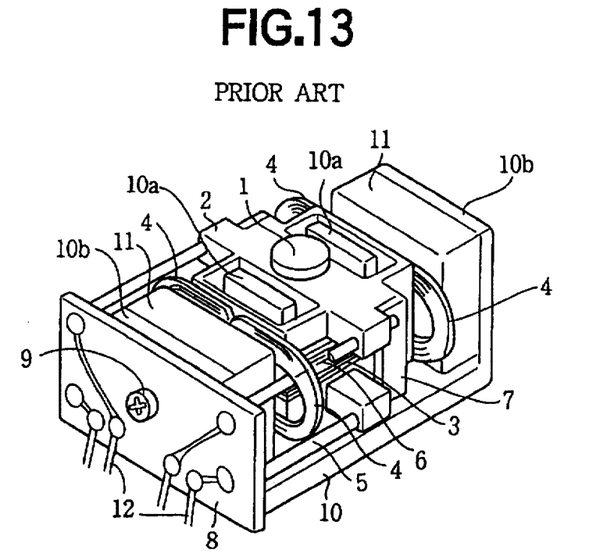
FIG. 13 is a perspective view showing a conventional optical pickup.
Figure 14:
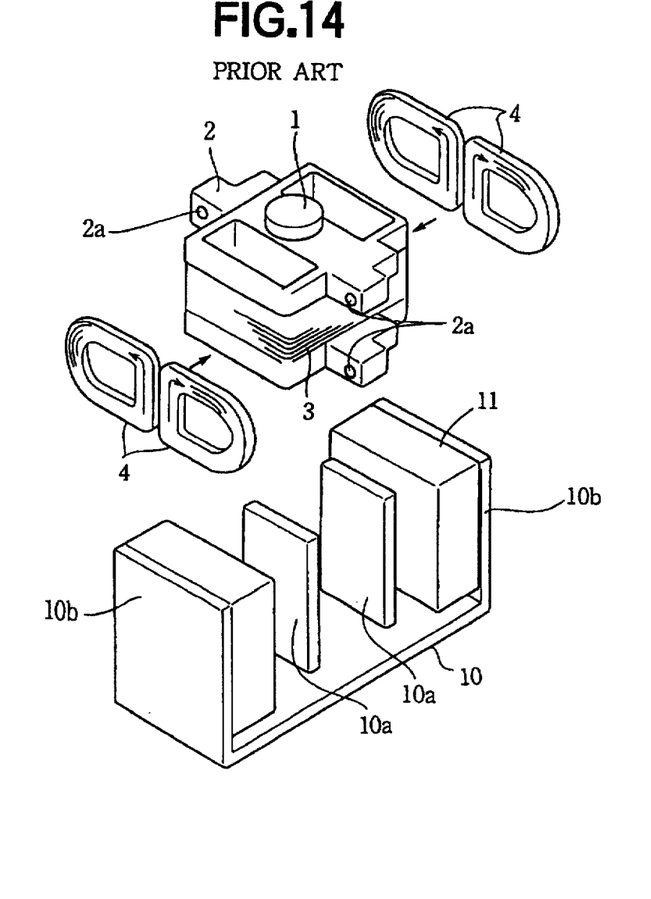
FIG. 14 is an exploded perspective view of the conventional optical pickup.

FIGS. 13 and 14 show a conventional optical pickup. A yoke base 10 made of magnetic material has a pair of inner yokes 10a and a pair of outer yokes 10b. A magnet 11 is secured to an inner portion of each outer yoke 10b. Thus, a magnetic circuit is formed between the magnets.

A printed circuit board 8 having a plurality of leads 12 is secured to one of the outer yokes 10b by a screw 9.

A holder 2 for holding an objective 1 is suspended from the printed circuit board 8 by four metallic wires 6 in the form of a cantilever. Each wire 6 is covered by a rubber tube 5. The holder 2 is disposed in the yoke base 10 and slidably engaged with the inner yokes 10a. The holder 2 has a focus coil 3 wound in the horizontal direction. A pair of tracking coils 4 each of which has a pair of D-shaped coils are secured to both sides of the focus coil 3.

A printed circuit board 7 is secured to the holder 2. Ends of the metallic wires 6 are inserted into holes 2a formed on the holder 2 and soldered to the printed circuit board 7. Both ends of each of the focus coil 3 and the tracking coils 4 are soldered to the printed circuit board 7 and electrically connected to the ends of the metallic wires 6 through copper foils.

When the leads 12 are connected to a source, current flows to the focus coil 3 and the tracking coils 4 through the wires 6. The focusing and tracking of the holder 2 having the objective 1 is controlled in accordance with an electromagnetic operation of the magnets 11.

Figure 15:
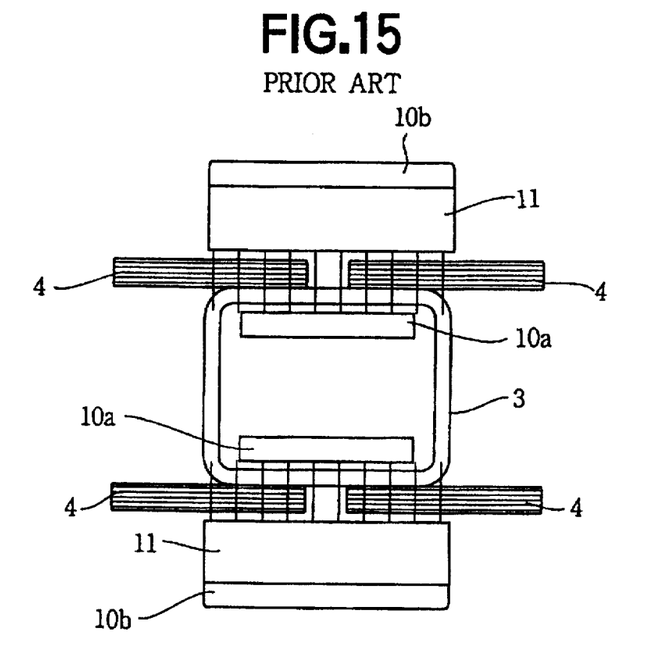
FIG. 15 is a plan view showing coils on a conventional holder.
Figure 16:
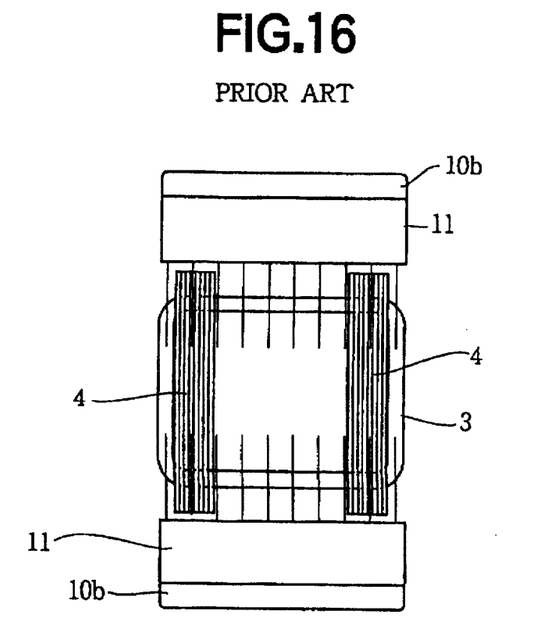
FIG. 16 is a plan view showing coils on another conventional holder.

In the pickup, the tracking coil 4 is secured to the focus coil 3. Accordingly, as shown in FIG. 15, the focus coil 3 and the tracking coil 4 occupy a large space, thereby increasing the magnetic gap formed between the inner yoke 10a and the magnet 11. Consequently, the density of magnetic flux becomes low, so that the magnetic efficiency is low.

Since the magnetic flux actuates perpendicular to the tracking coil 4, it is impossible to reduce a lateral width of the inner yoke 10a. Accordingly, the size of the holder 2 can not be reduced, thereby preventing the size of the pickup from reducing.

Furthermore, since the tracking coil 4 is secured to the sides of the focus coil 3, it is difficult to automatically wind the coils on the holder.

SUMMARY OF THE INVENTION

An object of the present invention is to provide an optical pickup where magnetic efficiency of a magnetic circuit is increased.

Another object of the present invention is to provide an optical pickup where a holder has a simple structure so that coils can be automatically wound on the holder.

According to the present invention, there is provided on an optical pickup for an optical disc player comprising a carriage provided so as to be moved in a radial direction of an optical disc, a holder provided with an objective and suspended on the carriage by suspension means, a magnetic circuit disposed adjacent to the holder and including a first magnetic pole and a second magnetic pole, surfaces of the first and second magnetic pole being parallel with each other and perpendicular to the surface of the optical disc, a focus coil provided around a vertical axis of the holder, and having a magnetic flux receiving portion, a tracking coil provided around a horizontal axis of the holder, and having a magnetic flux receiving portion.

Both of the magnetic flux receiving portions are disposed so as not to be overlapped with each other, and disposed in parallel with one of the surface of the first and second magnetic poles. Furthermore, both of the magnetic flux receiving portions are flush with each other.

The other objects and features of this invention will become understood from the following description with reference to the accompanying drawings.

DETAILED DESCRIPTION OF THE PREFERRED EMBODIMENTS

Figure 1:
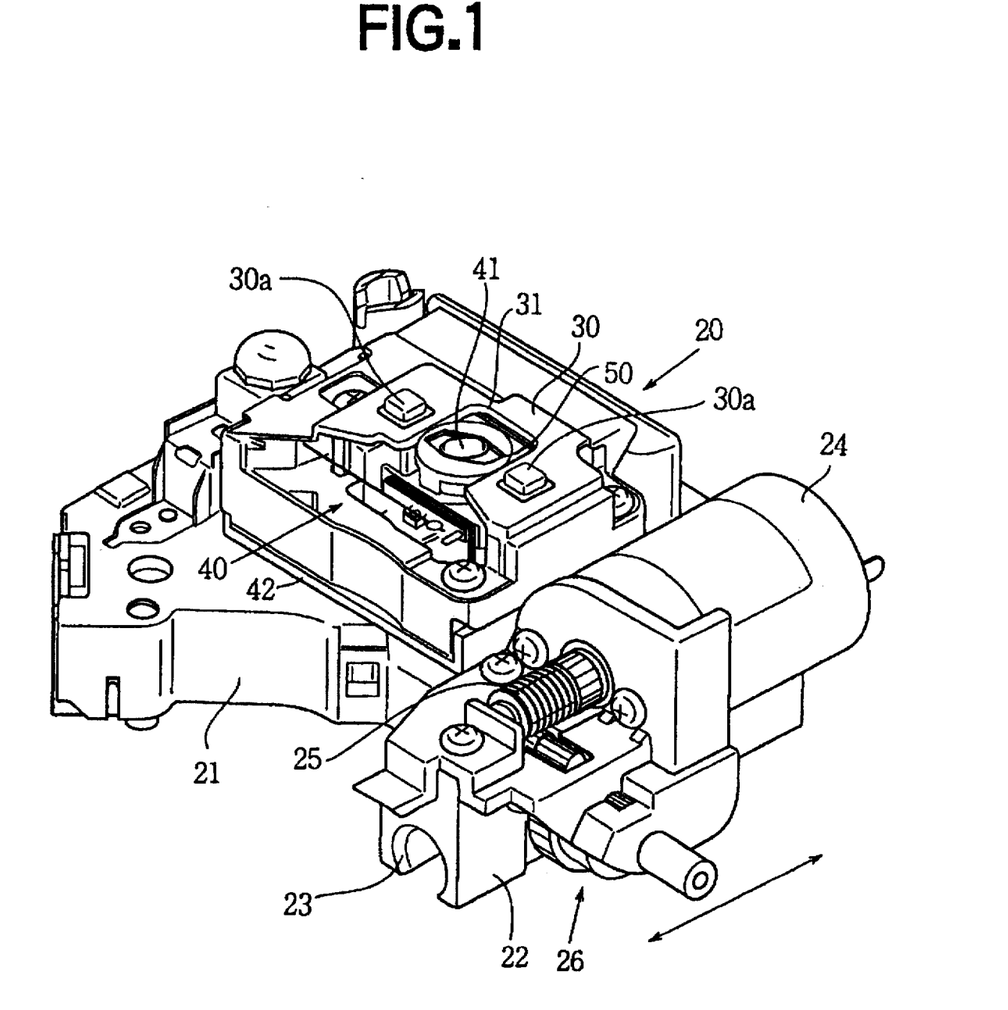
FIG. 1 is a perspective view showing an optical pickup according to the present invention.

Referring to FIG. 1, an optical pickup 20 of the present invention comprises a carriage 21, an actuator unit 40 mounted on the carriage, and a guide member 22 for guiding the carriage in a radial direction of a disc (not shown). The guide member 22 has a guide groove 23 formed on the underside thereof to be slidably mounted on a guide rail (not shown) extending in the radial direction of the disc shown by arrows. On the guide member 22, a carriage transmitting device is provided. The device comprises a driving motor 24, a worm gear 25 secured to a driving shaft of the motor, a worm wheel, and a pinion 26 which is secured to the worm wheel and engaged with a rack (not shown) provided along the guide rail.

On the actuator unit 40, a cover 30 having an opening 31 is mounted. The cover 30 has felts 30a for preventing the disc from being damaged when the disc contacts with the pickup during reproduction. An objective 41 having a cap 50 is exposed from the opening 31 of the cover 30.

Figure 2:
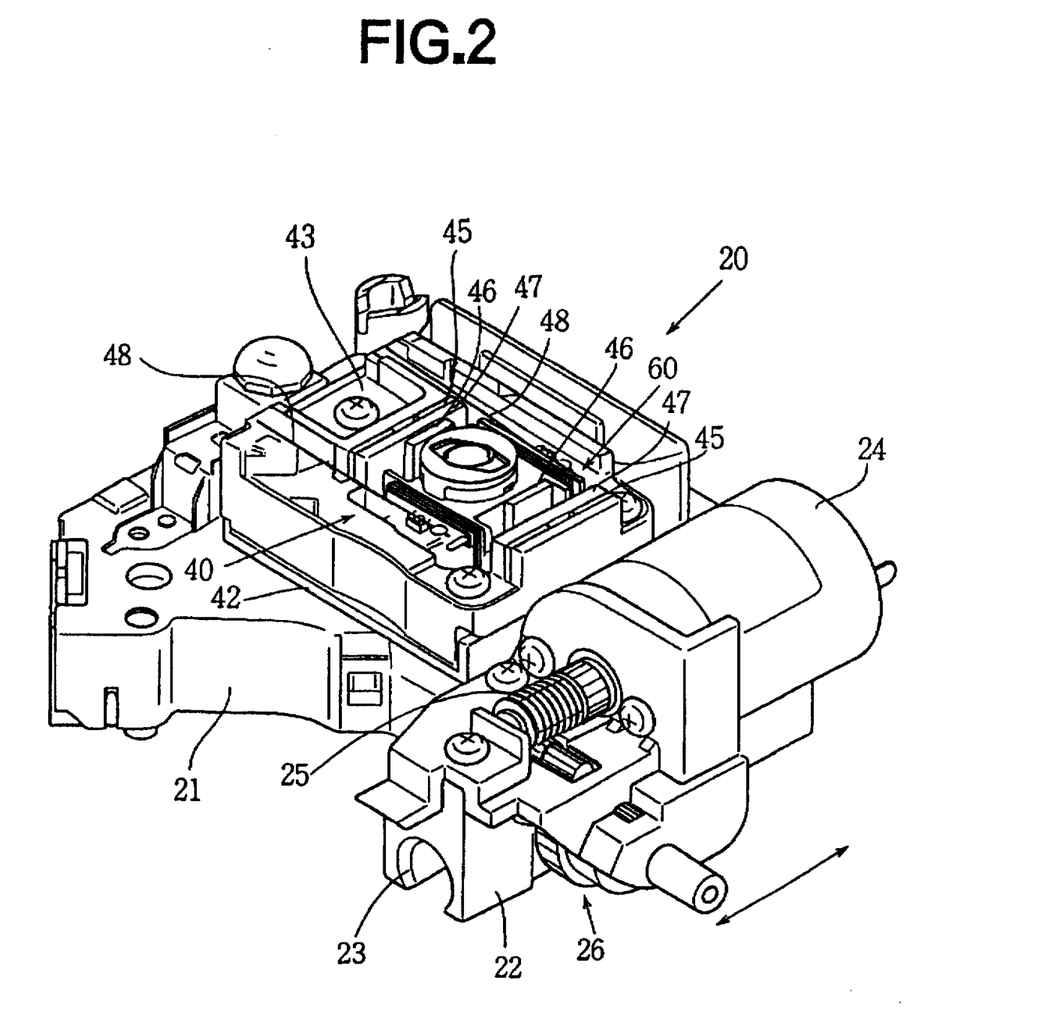
FIG. 2 is a perspective view of the optical pickup of FIG. 1 where a cover is removed.

FIG. 2 shows the pickup 20 of FIG. 1 where the cover 30 is removed. The actuator unit 40 comprises a yoke base 42 formed on the carriage 21, a suspension base 43 provided on the base 42, and a holder 60. The yoke base 42 has a pair of outer yokes 45 and a pair of inner yokes 46 provided corresponding to the outer yokes. A magnet 47 is secured to an inner portion of each of the outer yokes 45. The holder 60 is suspended from the suspension base 43 by four leaf springs 48 as conductive wires and disposed in a space between the inner yokes 46.

Figure 3:
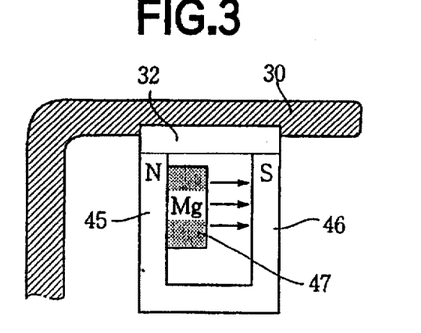
FIG. 3 is a sectional view showing a part of the cover.

Referring to FIG. 3, the cover 30 has a yoke 32 integrally formed therein. When the cover 30 is mounted on the actuator unit 40, the outer and inner yokes 45 and 46 of the yoke base 42 attract the yoke 32 to hold the cover 30.

In a corventional pickup, a cover has an engaging hook to be engaged with an engaging portion formed on a body of the pickup. Thus, the cover is secured to the pickup by engaging the hook with the engaging portion. However, if the hook is not firmly engaged with the engaging portion, the cover may be removed from the pickup because of vibration of the actuator unit.

In the embodiment of the present invention, the cover 30 is easily and securely attached to the actuator unit 40 with the attraction of the yokes 32 and 45, 46. Moreover, the cover is simplified in structure. Furthermore, since a closed circuit is provided between the yokes 45 and 46, efficiency of a magnetic circuit is increased.

Figure 4:
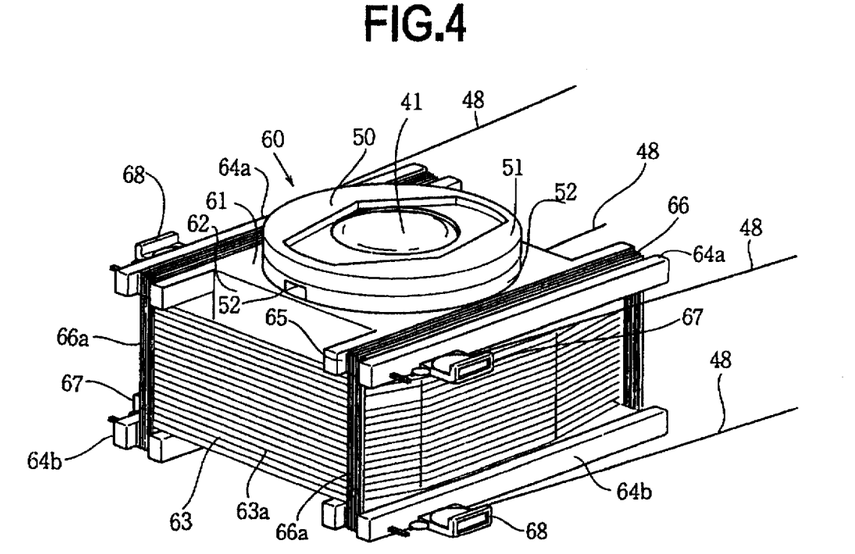
FIG. 4 is a perspective view showing a holder.
Figure 5:
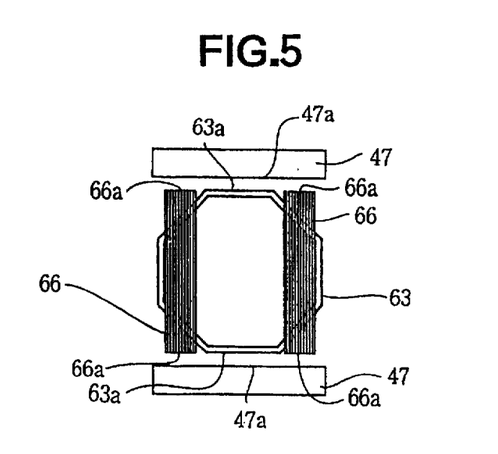
FIG. 5 is a plan view showing coils on the holder.

Referring to FIGS. 4 and 5, the holder 60 comprises a body 61 having an octagonal side wall 62, a pair of upper flanges 64a provide on opposite sides of an upper portion of the holder, and a pair of lower flanges 64b provided on a lower portion of the holder corresponding to upper flanges 64a. Each flange has bifurcated ends, each forming an outer groove 65. On the upper and lower flanges 64a and 64b, suspension members 67 and 68 are provided, respectively. Each suspension member is connected with the end of the corresponding leaf spring 48.

A focus coil 63 is horizontally wound around a vertical axis of the octagonal wall 62 of the body 61 between the upper and lower flanges 64a and 64b. A tracking coil 66 is divided into two parts and wound in the grooves 65 of the corresponding upper and lower flanges 64a and 64b, positioned above and below the focus coil 63.

The position of winding of the focus coil 63 is determined by the upper and lower flanges 64a and 64b, and the position of winding of the tracking coil 66 is determined by the grooves 65.

The focus coil 63 is positioned such that the axis thereof is parallel with the focus direction, and the tracking coil 66 is positioned such that the axis thereof is parallel with the tracking direction.

A the suspension members 67, both ends of the focus coil 63 are connected to the ends of a pair of springs 48. At the suspension members 68, both ends of the tracking coil 66 are connected to the other springs 48. Thus, electric current flows in each of the coils FIG. 5 shows the focus coil 63 and the tracking coils 66 wound on the holder 60. The focus coil 63 is wound on the octagonal side wall 62. A magnetic flux receiving portion 63a of the focus coil 63 is disposed in parallel with the magnetic pole 47a of the magnet 47. The tracking coils 66 are wound on the flanges 64a and 64b of the holder in perpendicular to the magnet 47, surrounding opposite side portions of the focus coil 63. A magnetic flux receiving portion 66a of each part of the tracking coil 66 is also disposed in parallel with the magnetic pole 47a of the magnet 47 to be flush with the magnetic flux receiving portion 63a of the focus coil 63. The surface of the magnetic pole 47a is vertical, and hence each of the magnetic flux receiving portion is vertical.

In accordance with the present invention, the magnetic flux receiving portion 66a of the tracking coil 66 is not overlapped with the magnetic flux receiving portion 63a of the focus coil 63, but overlapped with the opposite side portions of the focus coil 63 other than the receiving portion 63a. Thus, it is possible to locate the magnetic flux receiving portions 63a and 66a at positions very close to the magnets 47.

As shown in FIG. 4, a cap 50 is mounted on the holder 60 for protecting the objective 41 from contacting with the disc. The cap 50 has an elliptic opening 51 extending in the tracking direction, that is the tangential direction of the disc from which the objective 41 is exposed, and an air escaping hole 52 formed in a lower portion of the cap.

Figure 17:
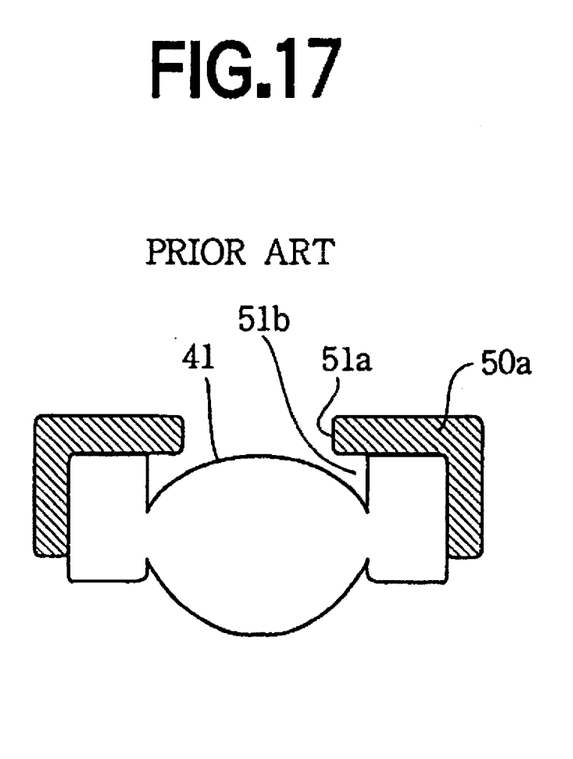
FIG. 17 is a sectional side view showing a conventional cap.

FIG. 17 sows a conventional cap 50a having a circular opening 51a. When the disc is rotated during the reproduction, air on the disc is moved in the tracking direction and enters the cap through the circular opening together with dust. The dust is gathered in a space 51b formed between the objective and the cap. Accordingly, a surface of the objective 41 is liable to become dusty.

In the embodiment, the elliptic opening 51 extending in the tracking direction causes the moving air to smoothly pass in the opening without staying therein, thereby preventing adhering of dust. Furthermore, since the air entered the cap with the dust passes through the escaping hole 52, the objective is prevented from being dusty.

Figure 6:
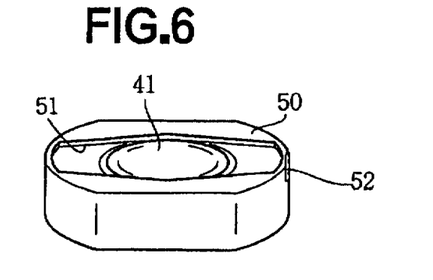
FIG. 6 is a perspective view showing a cap of an objective.

As shown in FIG. 6, the hole 52 may be formed on an upper portion of the cap.

The objective 41 is integrally mounted on an upper portion of the body 61. When the focus and tracking coils 63 and 66 are excited by control current, temperature of the body 61 is increased by the coils to raise temperature of the objective 41. The heat causes the aberration of objective to change. If a video disc is reproduced, quality of picture is deteriorated by the changed aberration.

Figure 7:
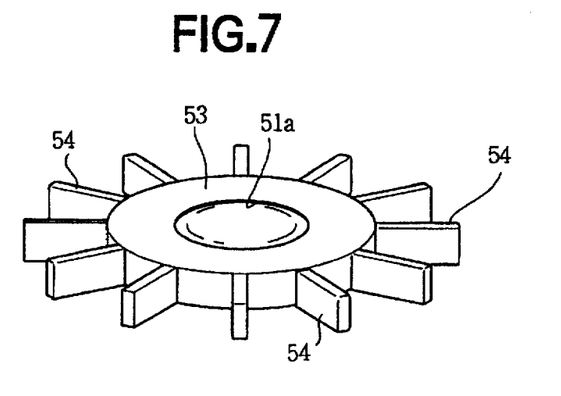
FIG. 7 is a perspective view showing a modification of the cap.

FIG. 7 shows a modification of the cap for eliminating the above mentioned disadvantage. A cap 53 has a heatsink 54 provided on a outer periphery of a cylindrical portion of the cap 53.

Flow of air is generated when the disc is rotated. The heatsink receives the flowing air to reduce the temperature of cap so that the temperature of the objective is reduced. The heatsink may be provided around the objective.

The circular opening 51a is replaced with the elliptic opening 51.

The focus and tracking coils 63 and 66 are automatically wound on the holder 60. Thereafter, the leaf springs 48 are connected to the suspension members 67 and 68 of the holder and the objective 41 is mounted on the holder.

Figure 8:
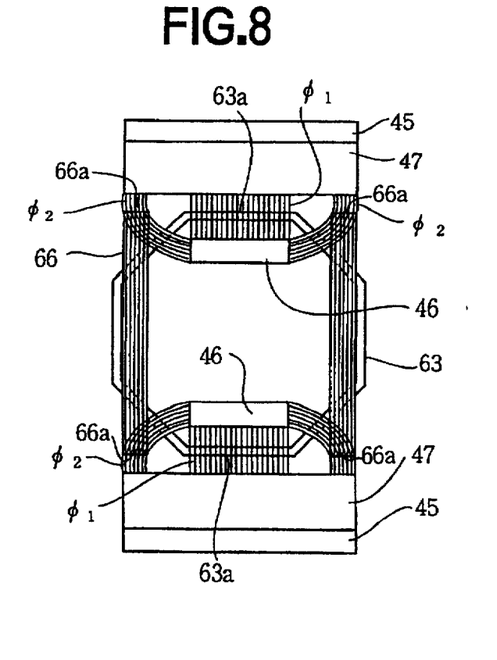
FIG. 8 is a plan view showing flows of magnetic flux.

The operation of the optical pickup will be described. Referring to FIG. 8, magnetic fluxes of the magnet 47 and the inner yokes 46 as magnetic poles operate on the focus coil 63 and the tracking coil 66. A linear magnetic flux $\phi 1$ operates on the focus coil 63 and a curved magnetic flux $\phi 2$ operates on the tracking coil 66.

When a current flows in the focus coil 63, magnetic flux generates in the direction perpendicular to the paper of FIG. 8 so that the holder 60 having the objective 41 is moved in the vertical direction, namely in the focus direction of the disc.

On the other hand, if a current flows in the tracking coil 66, magnetic flux generates in the lateral direction of FIG. 8 so that the objective 41 is moved in the radial direction of the disc.

In the embodiment, the magnetic flux receiving portions 63a and 66a of the focus coil 63 and tracking coil 66 are not overlapped, and disposed in a plane, and the inner yoke 46 is provided in the inside of the focus coil 63. Therefore, the magnetic flux receiving portions can be positioned at very close position to the magnet 47. Accordingly, the magnetic gap between the magnet 47 and the inner yoke 46 is reduced, thereby increasing the magnetic efficiency and sensitivities of focus control and tracking control.

Although the magnetic flux receiving portions 63a and 66a are not entirely faced to the inner yoke 46, the magnetic flux receiving portions 63a and 66a are close to the magnet 47 at maximum, it is possible to receive the magnetic flux of sufficient density. In addition, the inner yoke 46 is small in size so that the holder 60 can be reduced in size.

Figure 9:
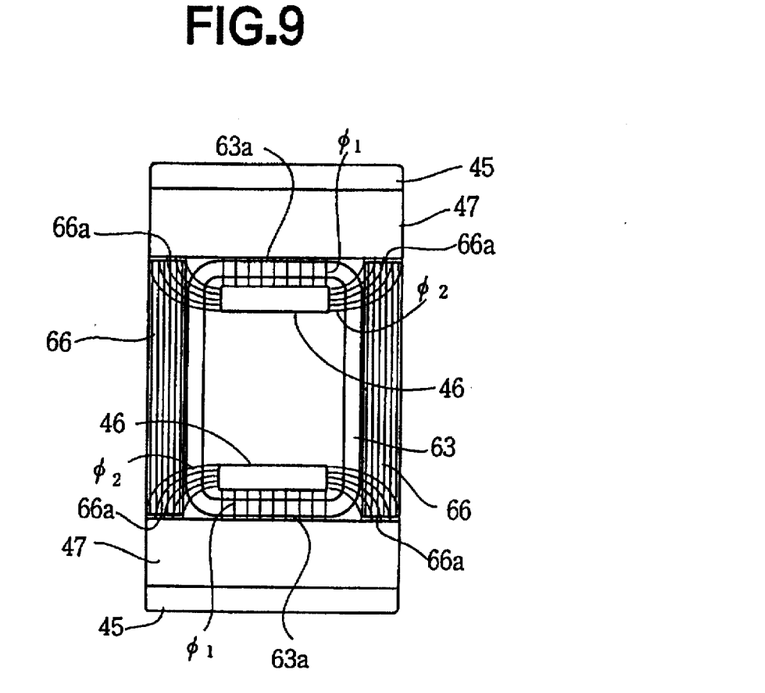
FIG. 9 is a plan view showing another embodiment of the holder.
Figure 10:
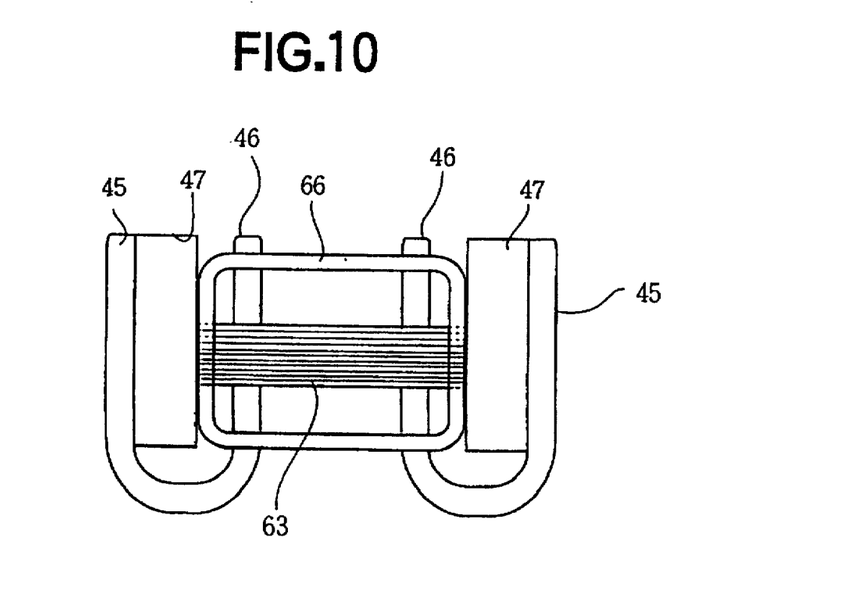
FIG. 10 is a side view of the holder of FIG. 9.

FIGS. 9 and 10 show another embodiment of the pickup. The tracking coil 66 is provided adjacent to both sides of the focus coil 63 without overlap. The focus coil has a rectangular shape.

Figure 11:
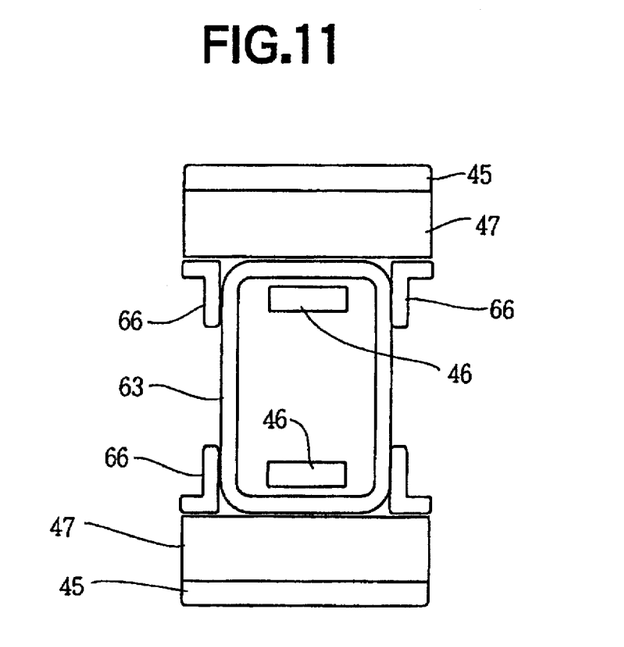
FIG. 11 is a plan view showing a modification of the holder of FIG. 9.

FIG. 11 shows a modification of FIG. 9. The tracking coil 66 is divided into four parts each of which has an L-shape and is provided at each corner of the focus coil 63.

Figure 12:
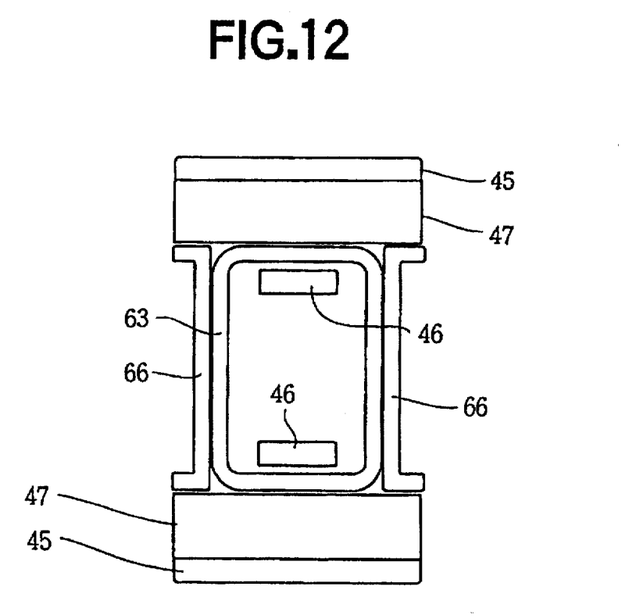
FIG. 12 is a plan view showing another modification of FIG. 9.

FIG. 12 shows another modification of FIG. 9 where the tracking coil 66 is divided into two parts each having U-shape, and provided on opposite sides of the focus coil 63.

In accordance with the present invention, the magnetic gap of the magnetic circuit is reduced, and the focus coil and the tracking coil are positioned close to the magnetic pole. Furthermore, the magnetic flux receiving portions of the coils are flush with each other. Consequently, magnetic efficiency is increased.

The magnet as one of the magnetic poles is provided on the outside of the holder, and the inner yoke as the other magnetic pole is provided in the inside of the holder. Both poles are disposed in parallel with the magnetic flux receiving portions of the coils. Thus, the inner yoke can be reduced in size, thereby reducing the size of the holder. Thus, the pickup becomes small.

Each of the coils is directly wound on the holder. Therefore, the winding of coil can be automatized.

The positioning of both coils is easily determined by the flanges having grooves of the holder so that the holder is simplified in construction.

While the presently preferred embodiments of the present invention has been shown and described, it is to be understood that these disclosures are for the purpose of illustration and that various changes and modifications may be made without departing from the scope of the invention as set forth in the appended claims.

What is claimed is:

1. An optical pickup for an optical disc player, comprising:

a carriage provided so as to be moved in a radial direction of an optical disc;

a plurality of leaf springs, each of which is secured to the carriage to a base end thereof and extends in an extending direction traverse to the radial direction;

a holder provided with an objective, and secured to a front end of each leaf spring, thereby to be suspended on the carriage by the plurality of leaf springs;

a magnetic circuit disposed adjacent to the holder and including first and second pairs of magnetic poles which are arranged along a common path in a direction parallel to the leaf spring extending direction, surfaces of the magnetic poles in the first and second pairs of magnetic poles are parallel with each other;

a focus coil provided around a vertical axis of the holder and having a magnetic flux receiving portion, at least one of the magnetic poles in each of the first and second pairs of magnetic poles is disposed within said focus coil;

a tracking coil provided around a horizontal axis of the holder which is traverse to the extending direction of the leaf springs, said tracking coil having a magnetic flux receiving portion;

both of the magnetic flux receiving portions being disposed so as not to be overlapped with each other, and disposed in parallel with one of the surface of the first and second magnetic poles.

2. The optical pickup according to claim 1 wherein both of the magnetic flux receiving portions are flush with each other.

3. The optical pickup according to claim 1 wherein each of the focus coil and the tracking coil is wound on a periphery of the holder.

4. The optical pickup according to claim 1 wherein each of the focus and tracking coils has two magnetic flux receiving portions corresponding to the magnetic pole.

5. The optical pickup according to claim 3 wherein the holder has an upper flange and a lower flange for positioning the focus coil, and each of the flange has grooves at both ends thereof for positioning the tracking coil.

6. The optical pickup according to claim 1, comprising four of said leaf springs.

7. The optical pickup according to claim 1, wherein said extending direction of said leaf springs is perpendicular to said radial direction.

8. The optical pickup according to claim 1, wherein said horizontal axis is perpendicular to said extending direction of said leaf springs.

9. The optical pickup according to claim 1, further comprising a cover adapted to cover said holder, said cover having a yoke which is adapted to magnetically couple to said magnetic circuit to secure said cover over said holder.

10. The optical pickup according to claim 1, further comprising a yoke base having pairs of inner and outer yokes, said inner yokes each being one of said magnetic poles of said first and second pairs of magnetic poles.

11. The optical pickup according to claim 10, further comprising a cover adapted to cover said holder, said cover having a yoke which is adapted to magnetically couple to one of said pairs of inner and outer yokes to secure said cover over said holder.

12. The optical pickup according to claim 1, further comprising a cap which is adapted to mount to said holder, said cap having an opening which aligns with said objective when said cap is mounted to said holder.

13. The optical pickup according to claim 12, wherein said opening in said cap is elliptical.

14. The optical pickup according to claim 12, wherein said cap has a heatsink provided at the outer periphery thereof.

15. The optical pickup according to claim 12, wherein said cap has a second opening therein which enables communication between an outside atmosphere and an inside of said cap when said cap is mounted to said holder.

* * * * *